Inventors
W. W. KEMP AND
W. HUNT
By Thomas W. J. Clark
Attorney

Patented Feb. 7, 1950

2,496,586

UNITED STATES PATENT OFFICE 2,496,586

ROTARY PROPORTIONING AND MIXING APPARATUS

William Wallace Kemp and William Hunt, Baltimore, Md., assignors to The C. M. Kemp Manufacturing Company, Baltimore, Md., a corporation of Maryland Application May 10, 1944, Serial No. 534,924

6 Claims. (Cl. 137—165)

This invention relates to an apparatus for feeding a proportioned mixture of air and gas or of two gases to a furnace or other consumer in which exactly the amount of air is supplied to completely burn the gas or to produce any desired ratio of the two gases.

The invention relates specifically to a rotary proportioning and mixing device for air and gas which will automatically operate in accordance with the rate of consumption of the mixture. Among the various objects of the invention are: to provide an apparatus that will continuously operate without binding and without accumulating a coat between the contacting valve members that would tend to separate those members, interfering with the accuracy of the device; to provide an apparatus that may be readily lubricated and which will hold its lubricant; to provide an apparatus that will allow for the accurate adjustment of the ratio between the air and gas or the two gases fed and which will mix the air and gas or gases intimately together as they pass through the device.

Another object of the invention is to supply the apparatus with air and gas, or two gases, at sufficient pressures to operate the valve without the need of an additional compressor. Another object of the invention is to so mount the operating parts of the apparatus that they will respond to the minutest change in demand. Another object is to maintain a pressure differential between the flow of air and gas or gases before their entry to the proportioning valve mechanism. Another object of the invention is to make a comparatively simple proportioning device so that several could be used in the same plant or one for each furnace without excessive expense and thereby remove the necessity of passing large conduits of completely combustible materials over considerable distances through manufacturing plants where employees have to be.

Other objects and advantages of the invention will be apparent from the following description and the accompanying drawings forming a part hereof and in which.

In the drawings similar numerals refer to similar parts in the several views.

Figure 1:
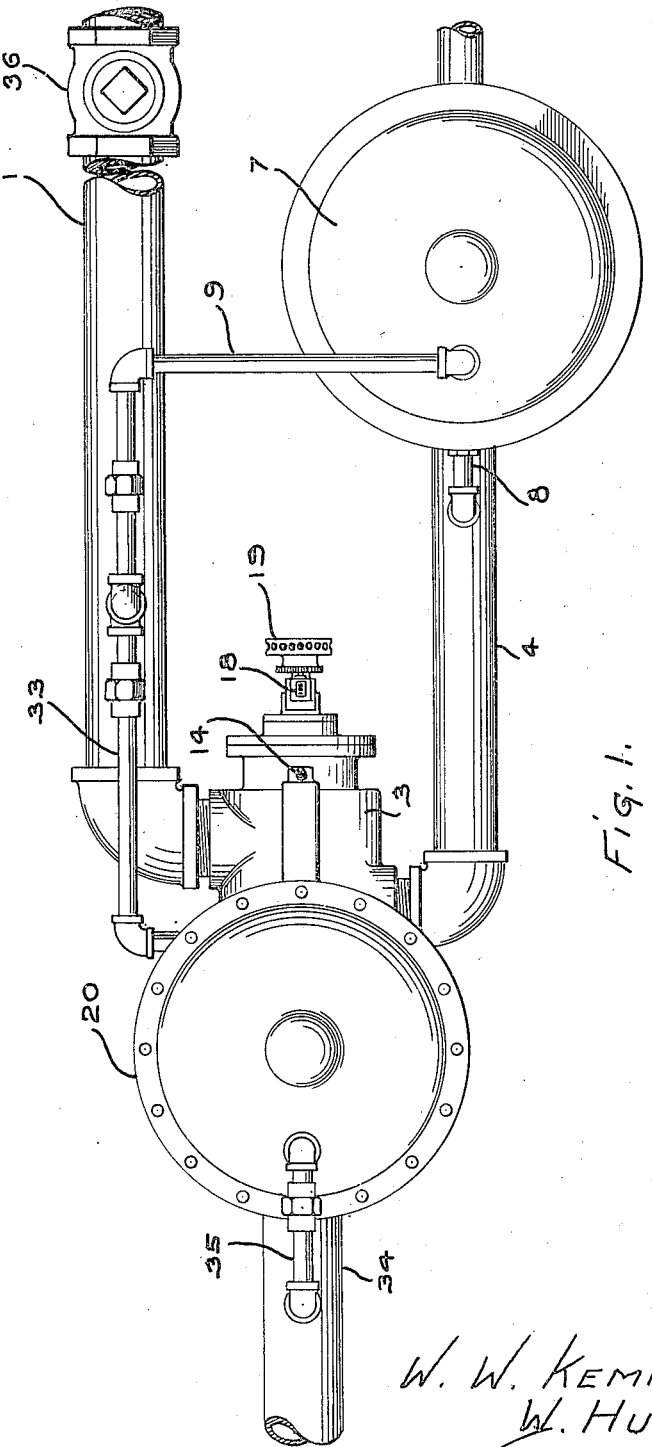
Figure 1 is a plan view of the apparatus of the invention.
Figure 2:
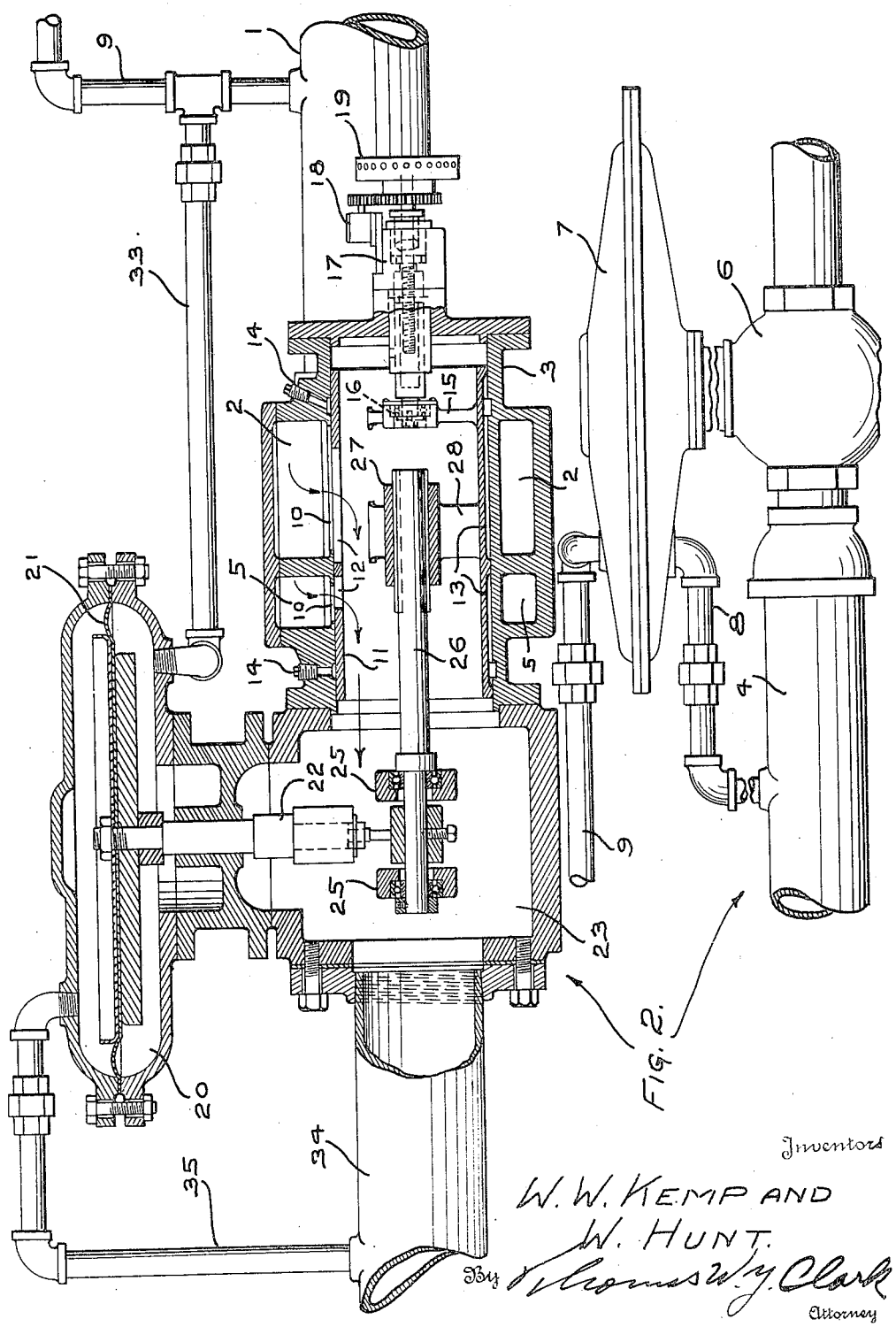
Figure 2 is a side elevational view thereof partly in section.
Figure 3:
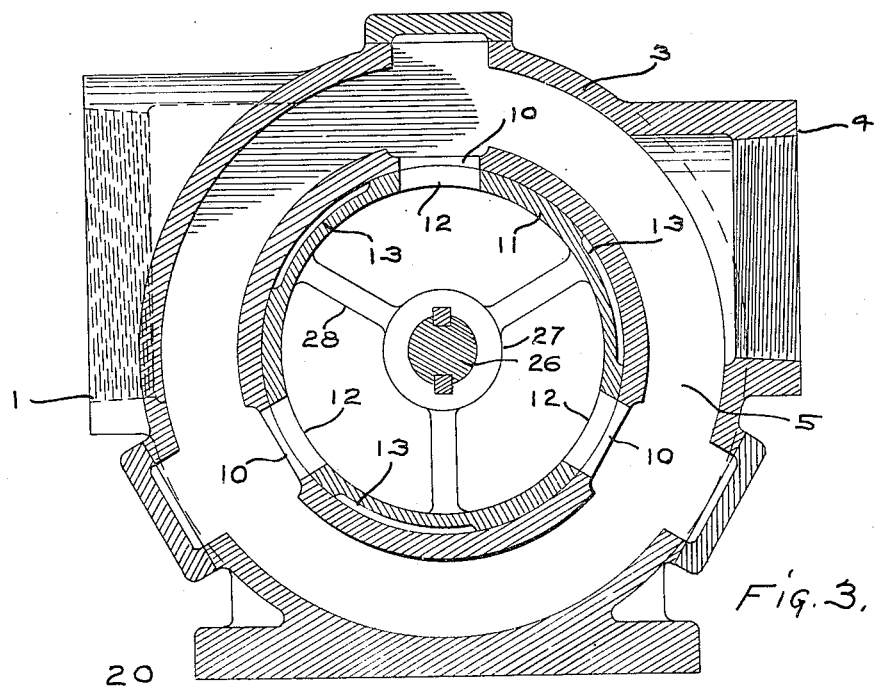
Figure 3 is a cross-sectional view of the proportioning valve and its chamber.
Figure 4:
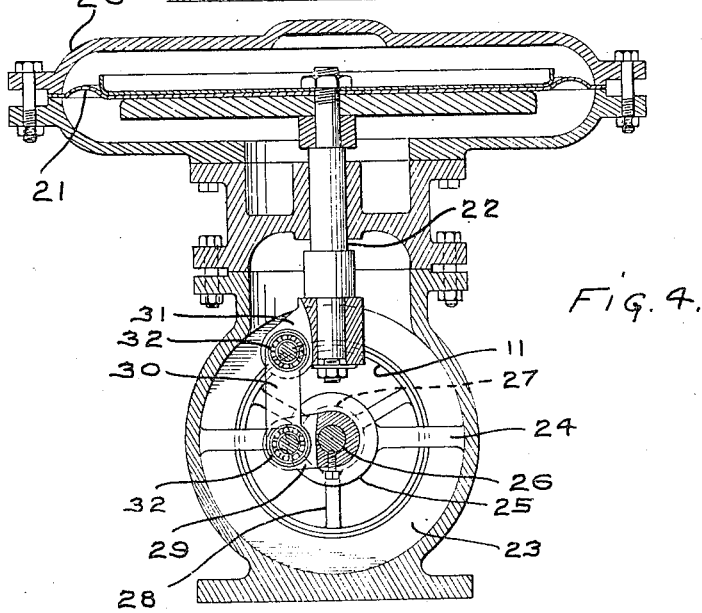
Figure 4 is a cross-sectional view of the diaphragm chamber showing its connection with the proportioning valve.

Wherever, herein, an air conduit and a gas conduit are referred to, it will be apparent that the conduits may carry two gases, air may be considered a gas.

An air conduit 1 admits air to the manifold 2 of the chamber 3.

A gas conduit 4 admits gas to the gas manifold 5 of chamber 3. A gas regulating valve 6 is in the gas line 4 and that valve is closed by means of a diaphragm in the diaphragm chamber 7 in its normal position of rest. The lower side of the diaphragm chamber 7 is connected with gas conduit 4 through pipe 8 and the upper side of the chamber is connected to air conduit 1 by means of pipe 9. The entrance of air above the diaphragm, due to pressure in the air conduit, opens the valve 6 and allows the passage of gas therethrough. The diaphragm in chamber 7 is preferably adjusted to maintain a pressure differential between the air and gas of 2" of a water column.

The chamber 3 has within each separate manifold 2 and 5 valve openings 10 for the passage separately, of air and gas therethrough. A cylindrical valve member 11 fits closely within the cylindrical wall of the chamber 3 and has valve seats 12 registering with the valve openings 10 to permit the passage of air and gas into and through the cylindrical valve member 11. The walls of the valve member 11 are cut away as shown at 13 between the valve seats 12 to form grease reservoirs which may be filled through openings 14. Because the pressure within the valve is so nearly equalized on all surfaces there is no tendency to force the grease from the reservoirs 13. The grease not only lubricates, it also forms a seal between the valve openings and valve seats.

The cylindrical member 11 has webs 15 in which are centrally placed bearings 16. Passing through the end of chamber 3 is an adjusting mechanism 17 attached to the bearing 16, and having thereon a counter 18. Turning handwheel 19 of the adjusting mechanism moves the cylinder 11 longitudinally and because of the relative location of the valve seats therein and the valve openings in the manifolds of the chamber 3, moving the cylinder to the right will widen the air valves and simultaneously close the gas valves. Moving the cylinder 11 to the left will have the opposite effect.

A diaphragm chamber 20 has diaphragm 21 therein and the stem 22, attached to the aphragm, projects into chamber 23 at the end of the valve chamber 3 opposite the adjusting mechanism. Within this chamber 23 are webs 24 supporting bearings 25 through which pass shaft 26 keyed to cylinder 11 by means of the hub 27 on webs 28 therein. Shaft 26 has fast thereto ear 29 connected by means of link 30 to ear 31 on stem 22 through means of bearings 32. The lower side of the diaphragm chamber is connected to the air conduit 1 by means of pipe 33.

This invention is an improvement over the apparatus shown in Patent No. 1,771,223. As shown therein a compressor is placed at the discharge conduit of the valve and this compressor is used to send the combustible mixture throughout a manufacturing plant to distribute that mixture to a number of burners in the plant.

The proportioning apparatus of the present invention may likewise be used with a compressor like that shown in the patent mentioned, the compressor drawing the fuel from the discharge conduit 34. Shutting off some burners or turning them down will vary or reduce the demand for the mixture at the discharge conduit 34. A reduction in the demand for fuel will correspondingly increase the pressure within conduit 34, and by means of the pipe 35 connected thereto and to the top of the diaphragm chamber 21, this increase of pressure will proportionately cut down the size of the openings in the valve passing fuel mixture therethrough, by rotating the valve through stem 22, link 30 and shaft 26. Completely closing off the passage of the mixture from conduit 34 will completely shut the valve and any opening for the passage of fuel mixture through conduit 34 will correspondingly open the rotary valve to permit a proportioned flow of air and gas of the correctly adjusted ratio to pass therethrough.

One object of this invention is to supply the gases, or air and gas, to conduits 1 and 4 with sufficient pressure to rotate the cylinder 11 through operation of diaphragm 21, without a compressor being at the discharge conduit 34, and in that event the pressure of the air and gas entering the valve will be utilized to carry the mixture to the burners. It will be apparent that the partial or complete opening or closing of valve 36 located in the air conduit 1 will likewise control the volume passing through the discharge conduit 34 without changing the ratio of the two gases, or air and gas, the cylinder 11 in this case rotating in proportion to the pressure in conduit 1, before entering the valve chamber 3.

It has heretofore been the practice to use one of the sliding valve mixing regulators in each plant and by means of a large conduit to pass the proportioned mixture of fuel therethrough to the various furnaces. Although many safety devices have been employed to prevent accidents, the presence of a completely combustible mixture has always been something of a hazard. The device of the instant invention is so inexpensive that separate air and gas conduits can be led to each furnace and there the products accurately proportioned and mixed by means of the apparatus of this invention immediately prior to passing them into the furnace, thus avoiding the hazard of passing the completely combustible mixture through one conduit through the plant.

Although reference has been made throughout this description that the apparatus is intended to be used for feeding a combustible mixture to combustion furnaces, it will be apparent that the mixture need not be combustible and that any other consumer could be fed rather than a furnace without any departure from the invention.

Likewise the use in the apparatus of two gases, rather than air and gas, is contemplated, and is intended to be covered by the appended claims.

The preferred embodiment of the invention has been shown and described; it will be apparent that changes may be made in the details disclosed without departing from the spirit of the invention as expressed in the following claims.

What is claimed as new and is desired to be secured by Letters Patent is:

1. Apparatus to feed a proportioned mixture of air and gas to meet a varying demand comprising a discharge conduit, a cylindrical chamber connected at one end to said conduit, said chamber being closed at the other end and having ports therein and longitudinally spaced manifolds therearound covering said ports, one manifold for the admission of air thereto, and another, gas, conduits for the admission, respectively, of air and gas to said manifolds, a movable cylindrical valve member in said chamber provided with ports registering with said chamber ports to permit the flow of air and gas thereinto, means passing through the closed end of said chamber to move the valve member lengthwise to effect variable registry of the ports at the same time enlarging the passages of the ports leading from one manifold and diminishing those of the ports leading from the other manifold to vary the ratio of air and gas and means responsive to pressure variations in one of said conduits to rotate the valve member, rotation simultaneously opening or closing the passage of all the ports to vary the flow of constant ratio air and gas mixture.

2. Apparatus to feed a proportioned mixture of air and gas to meet a varying demand comprising a discharge conduit, a cylindrical chamber closed at one end and connected at the other end to said conduit, said chamber having around its circumference longitudinally separated groups of ports for the entrance separately of air to one longitudinal group and gas to another, conduits connected to the chamber for the admission of air and gas to said respective ports, a movable cylinder within said chamber having ports therein registering with said chamber ports to allow for the flow of air and gas thereinto, movement of the cylinder effecting variable registering of the respective air and gas port groups, in one direction, at the same time enlarging the passages of one group and diminishing those of the other group, manual means to move said cylinder lengthwise to vary the ratio of air and gas, a diaphragm moved in one direction by an increase in pressure in said discharge conduit, connections between said diaphragm and cylinder to rotate the cylinder to reduce the flow of mixture therethrough with said increase in pressure, means to move the diaphragm in the opposite direction upon a decrease in pressure in the discharge conduit to increase the flow of mixture through the cylinder.

3. Apparatus to feed a proportioned mixture of air and gas to meet a varying demand comprising a discharge conduit, a cylindrical chamber closed at one end and connected at the other end to said conduit, said chamber having around its circumference longitudinally separated groups of ports for the entrance separately of air to one longitudinal group and gas to another, conduits connected to the chamber for the admission of air and gas to said respective ports, a movable cylinder within said chamber having openings therein registering with said chamber ports to allow for the flow of air and gas thereinto, movement of the cylinder effecting variable registering of the respective air and gas port groups, in one direction, at the same time enlarging the passages of one group and diminishing those of the other group, manual means to move said cylinder lengthwise while permitting freedom of rotation, to vary the ratio of air and gas and means operable in response to variations in pressure in one of said conduits to rotate said cylinder, while permitting lengthwise movement, to vary the flow of the proportioned air and gas mixture therethrough.

4. Apparatus to feed a proportioned mixture of air and gas to meet a varying demand comprising a discharge conduit, a valve chamber having longitudinally spaced groups of ports therein, the chamber being connected to said conduit, separate conduits feeding air and gas separately, air to one group of ports and gas to the other group of ports spaced longitudinally from the air ports in said chamber, a movable proportioning cylinder in said chamber, having ports therein registering with the chamber ports, movement of the cylinder effecting variable registering of the respective air and gas port groups, movement lengthwise at the same time enlarging the passages of one group and diminishing those of the other group, and rotation of the cylinder simultaneously opening or closing the passages of all the ports, means communicating between said air and gas conduits, ahead of said chamber, to regulate the relative pressures of air and gas, and means for effecting longitudinal movement of said cylinder to vary the ratio of air and gas passing through the cylinder, and means responsive to the pressure in one of said conduits to effect rotation of said cylinder to vary the flow of proportioned air and gas mixture.

5. Apparatus to feed a proportioned mixture of air and gas to meet a varying demand comprising a discharge conduit, a valve chamber having two groups of ports, one being spaced longitudinally from the other, said chamber being connected to said conduit, a rotatable and longitudinally movable valve in said chamber having ports therein registering with the chamber ports, means including separate conduits to admit, separately, air to one group of ports and gas to the other, movement of the cylinder effecting variable registering of the respective air and gas port groups, movement lengthwise, at the same time enlarging the passages of one group and diminishing those of the other group, and rotation of the cylinder simultaneously opening or closing the passages of all ports, means to move said valve longitudinally to vary the ratio of air and gas passing therethrough, and means to rotate the valve to vary the flow of proportioned air and gas passing therethrough, said last named means including a diaphragm chamber having a diaphram therein operably connected to said valve to rotate the same, and connections between said diaphragm chamber and one of said conduits to transmit variations in pressure in said conduit to said diaphragm.

6. Apparatus to feed a proportioned mixture of air and gas to meet a varying demand comprising a discharge conduit, a cylindrical chamber closed at one end and connected to the discharge conduit at the other end, separate conduits for the admission of air and gas to said chamber, said chamber having therein longitudinally spaced groups of ports, said air conduit being connected with one group of said ports and said gas conduit being connected with another group of said ports spaced longitudinally from the air connected ports, a substantially hollow cylinder having port openings therein registering with the chamber ports and movable longitudinally in said chamber to effect variable registry of the respective groups of air and gas ports, at the same time enlarging the passages of one group and diminishing those of the other group, thereby to vary the proportions of air and gas passing therethrough, means movable within the axis of said cylinder to move the cylinder longitudinally and means responsive to the pressure in one of said conduits to rotate the cylinder, rotation of the cylinder simultaneously opening or closing the passages of all ports to vary the flow of the proportioned air and gas mixture, said last named means including an axially extending rod having an arm extending angularly therefrom within said chamber to effect the rotation of the cylinder.

WILLIAM WALLACE KEMP.
WILLIAM HUNT.

REFERENCES CITED

The following references are of record in the file of this patent:

UNITED STATES PATENTS

| Number | Name | Date |
|---|---|---|
| 486,747 | Wilkinson | Nov. 22, 1892 |
| 1,169,090 | Lucke | Jan. 18, 1916 |
| 1,457,207 | Boone | May 29, 1923 |
| 1,943,865 | Hennessey | Jan. 16, 1934 |
| 2,032,641 | Thomas | Mar. 3, 1936 |

FOREIGN PATENTS

| Number | Country | Date |
|---|---|---|
| 55,884 | Denmark | of 1939 |
| 113,160 | Great Britain | of 1918 |
| 552,778 | Germany | of 1932 |